Feb. 5, 1957 W. A. FIEDLER 2,780,059
JET DIRECTION CONTROL DEVICE

Filed Nov. 29, 1955 3 Sheets-Sheet 2

INVENTOR
WILLY A. FIEDLER

BY
ATTORNEYS

United States Patent Office 2,780,059
Patented Feb. 5, 1957

2,780,059

JET DIRECTION CONTROL DEVICE

Willy A. Fiedler, Oxnard, Calif.

Application November 29, 1955, Serial No. 549,890

6 Claims. (Cl. 60—35.55)

(Granted under Title 35, U. S. Code (1952), sec. 266)

The invention described herein may be manufactured and used by or for the Government of the United States of America for governmental purposes without the payment of any royalties thereon or therefor.

The present invention relates to a jet direction control device for use in conjunction with jet propelled aircraft and more particularly to a jet direction control device utilizing a movably mounted control member which may be selectively moved into the gaseous jet issuing from a discharge nozzle thereby deflecting the jet and changing the direction of thrust thereof to effectively alter the direction of flight of the aircraft.

Similar devices for steering aircraft are known in the art as shown for example in U. S. Patent #2,472,839. Such directional control means are adapted for use either in piloted aircraft or guided missiles wherein the propulsive force is provided by a gaseous jet issuing from a discharge nozzle at the rear of the aircraft, the jet being produced either by conventional jet aircraft engines or rocket engines.

Since the advent of supersonic aircraft, the problem of controlling the direction of aircraft has become increasingly difficult due to the large forces required to operate conventional aircraft controls such as elevators, ailerons, etc. One possible solution to the problem is the elimination of conventional aircraft controls and the provision of jet controls wherein the direction of thrust of the jet is suitably altered to change the course of the aircraft.

Prior devices such as shown for example in U. S. Patent #2,472,839 have the disadvantage of producing excessive drag on the aircraft due to the fact that the jet control member is mounted exteriorly of the aircraft such that the air stream impinges on the control member. Additionally, relatively large forces are required to operate a control member having a configuration such as shown in the aforementioned patent wherein large hinge moments are developed about the pivot point of the control member mounting means. As a consequence of the relatively large forces required to operate such devices, an additional conduit is extended from the fuselage to provide an auxiliary jet having a considerably smaller discharge area than the main jet and accordingly creating less resistance to actuation of the device. It is obvious that the provision of such a conduit projecting laterally from the fuselage creates additional undesirable drag on the aircraft.

In order to effectively control the direction of the aircraft, it is necessary to provide a considerable deflection of the jet issuing from the discharge nozzle, and this result is not obtainable in a device such as shown in the aforementioned patent wherein the pivotal movement of the jet control member is severely limited since the leading edge thereof engages the outer wall of the conduit on which it is mounted after only a small angular displacement from the neutral position. Furthermore, should a failure occur in the actuating mechanism for the jet control member, there is no provision of a positive safety means which will return the control member to the neutral position. As a result, it is possible for the jet control to oscillate back and forth in the jet causing erratic and uncontrolled movements of the aircraft such that it may be directed far off the desired course.

The present invention provides an arrangement wherein the jet control is positioned about the main discharge nozzle of the aircraft thereby eliminating the necessity of an auxiliary conduit and discharge nozzle. A cavity is provided in the fuselage of the aircraft for enclosing the jet control means such that the outer surface of the fuselage forms a smooth contour and the air stream does not impinge upon the control means, thereby considerably reducing the drag on the aircraft. The cavity is also provided with such a configuration as to permit pivoting of the control means through a large angle, and at the same time this configuration reverses the induced gas flow within the cavity which is produced during operation of the device. The diametrically inner portion of the trailing edge of the so called jetevator control member is also beveled to provide a force thereon which normally biases the control member into neutral position such that upon failure of the actuating means for the jetevator control means, the invention device will not thereafter alter the course of the aircraft.

An object of the present invention is the provision of a new and novel jet direction control device which reduces the drag of the device to a minimum.

Another object is to provide a jet direction control device which provides a safety feature wherein upon failure of the actuating means for the device, the control means will automatically return to the neutral position.

A further object of the invention is the provision of a jet direction control device which is simple and inexpensive in construction, yet sturdy and reliable in operation.

Other objects and many of the attendant advantages of this invention will be readily appreciated as the same becomes better understood by reference to the following detailed description when considered in connection with the accompanying drawings wherein.

Figure 1:
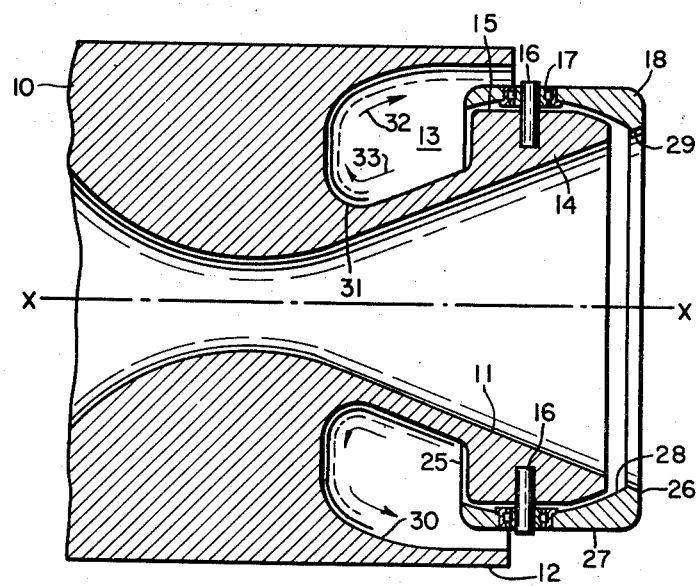
Fig. 1 is a longitudinal section of the present invention.

Referring now to the drawings wherein like reference characters designate like or corresponding parts throughout the several views, there is shown in Fig. 1 a body means 10 which represents the rear portion of the fuselage of an aircraft such as a piloted airplane or guided missile which is propelled by a conventional jet engine or rocket motor. The rear portion of the body means is hollow and is provided with a conventional diverging nozzle 11 adapted to exhaust and expand a gaseous jet to provide propulsive force for the aircraft, the body means and the nozzle being formed symmetrically about a longitudinal axis X—X. The body means is substantially cylindrical in configuration and the rear end portion 12 thereof is provided with an annular cavity 13 surrounding nozzle 11 and defining a discharge end portion 14 between the cavity and the interior of the nozzle, portion 14 extending rearwardly of portion 12.

Discharge end portion 14 has a substantially cylindrical shoulder 15 formed thereon which supports two diametrically opposite pivot pins 16 secured thereto. Each of pins 16 supports a conventional roller bearing 17 which in turn supports the jetevator control member 18 which is substantially annular in configuration.

Jetevator member 18 has a leading edge 25 and a trailing edge 26, the outer surface 27 thereof being substantially cylindrical and the inner surface 28 thereof defining a segment of a sphere. It is evident that jetevator control member 18 is adapted to be pivoted about pins 16 and any desired actuating means (not shown) may be provided for operating member 18 through the medium of a suitable linkage connected to the leading edge of the control member at a point displaced 90 degrees from pins 16.

Control member 18 is shown in neutral position wherein it will have no effect upon the gaseous jet issuing from the nozzle 11. As control member 18 is pivoted about pin 16, it will move progressively into the jet stream causing larger and larger deflections of the jet which will alter the direction of the thrust thereof and change the direction of movement of the aircraft.

It is apparent that in the neutral position shown, the trailing edge of control member 18 is positioned closely adjacent the outer edge of discharge end portion 14 and that a small clearance is provided between the outer edge of portion 14 and the inner surface 28 of the control member. Such clearance is necessary since during operation, heat will cause the metallic member 18 and portion 14 to expand; and consequently it is not possible to have these members in contact with one another at all times. It should be noted, however, that it is desirable to maintain the inner surface 28 as near to the outer edge of portion 14 as possible during operation.

It is obvious that upon pivotal movement of control member 18, half of annular member 18 will be pivoted in a rearward direction and the other half will be pivoted in a forward direction. Cavity 13 is so constructed as to provide maximum deflection of control member 18 such that the forwardly pivoting portion of the control member is allowed to move forwardly and downwardly to a point abutting the outer wall of the nozzle portion.

The forward portion of control member 18 is disposed within cavity 13 when in neutral position thereby preventing any entrainment of air from the atmosphere and reducing the drag created by the device since the fuselage of the aircraft terminates in a smooth contour. During operation, however, when control member 18 is pivoted into the jet stream, a gaseous flow will be induced between the outer surface of portion 14 and the inner surface 28 of the control member from the jet into cavity 13. If such induced gas flow were merely allowed to escape in a direction normal to axis X—X or to circulate in a random manner within chamber 13, the energy of the induced gas flow would be uselessly dissipated. In order to obtain a useful reaction in the forward direction of motion of the aircraft, the cavity is so shaped as to have a cross-sectional configuration as shown in Fig. 1 wherein the inner wall thereof has arcuately shaped portions as indicated at 30 and 31 such that the induced gas flow is deflected to follow a path indicated by arrows 32 and 33. The arcuate walls of the cavity thereby efficiently absorb the energy of the induced gas flow in much the same manner as the turbine blades in a steam turbine, reversing the gas flow within the cavity and creating a reaction force assisting the main jet in propelling the aircraft in a forward direction.

Due to the pivotal mounting of control member 18 and the spherical configuration of inner surface 28 thereof, no hinge moments are developed about pivot pin 16 and it is therefore quite easy to operate the jetevator control. When the jetevator control has been moved into the jet stream however, it will tend to remain in such position should the actuating means therefor fail during operation. Furthermore, if the actuating means fails, there is a danger that the control member will oscillate into and out of the jet stream causing erratic motions of the aircraft. To overcome this difficulty, the diametrically inner portion of trailing edge 26 is beveled to provide an oblique surface 29 which when acted upon by the jet stream creates a force on the control member biasing it to neutral position as shown in Fig. 1 of the drawing. It should be noted that when in neutral position, the beveled surface 29 is aligned with the rearward portion of the interior of nozzle 11 to simplify alignment of the nozzle and the control member. The hinge moment developed by surface 29 must be positive for safety considerations and should be small to minimize the size of the actuator required for the control member.

Figure 2:
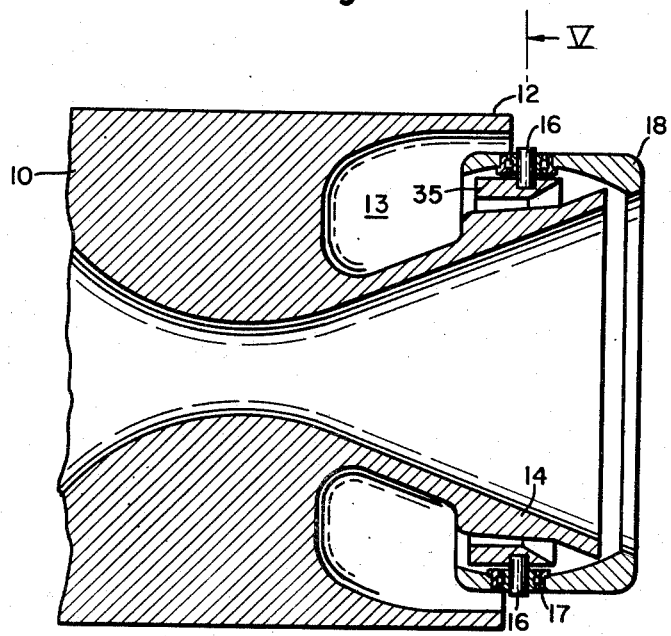
Fig. 2 is a view similar to Fig. 1 illustrating a modification thereof.
Figure 5:
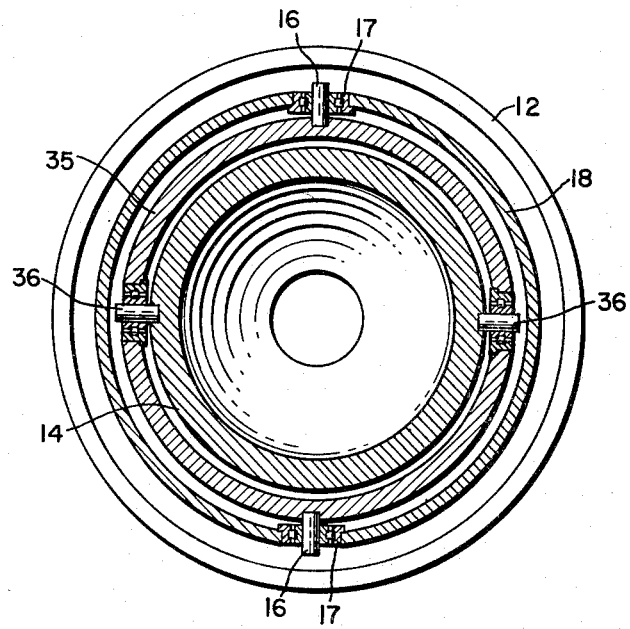
Fig. 5 is a vertical section taken along line V—V in Fig. 2.

Fig. 2 illustrates a modification of the device shown in Fig. 1 wherein control member 18 is pivotally mounted upon an annular shaped ring member 35 in the same manner in which it was mounted upon portion 14 in Fig. 1. As shown in Fig. 5, the ring member is also pivotally mounted on two diametrically opposite pivot pins 36 which are secured to discharge inner portion 14 at points displaced 90 degrees from the pivot pins supporting the control member on the ring member. With such a gimbal arrangement, control member 18 may be pivoted in a universal manner and suitable control means (not shown) may be provided for actuating the control member and the ring in a manner similar to that disclosed for actuating the corresponding members in U. S. Patent #2,472,839. The remaining structure of the device shown in Fig. 2 is identical with that shown in Fig. 1.

Figure 3:
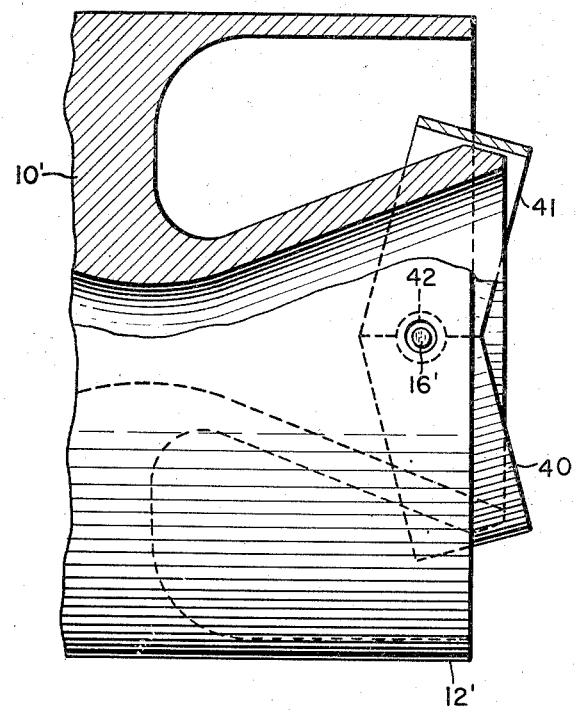
Fig. 3 is an elevation, partially in section, of a modification of the present invention.

Fig. 3 illustrates a modification of the device wherein body means 10' and the components thereof are similar to those shown in Fig. 1 and which utilizes a different type of control member. In place of the unitary annular shaped control ring utilized in Fig. 1, the device shown in Fig. 3 employs a control member comprising two arcuately shaped members 40 and 41 connected for simultaneous pivotal movement and being disposed at an angle to one another as most clearly seen in Fig. 3 whereby the trailing edges of members 40 and 41 are disposed adjacent the rear end of discharge portion 14 when in neutral position.

Figure 4:
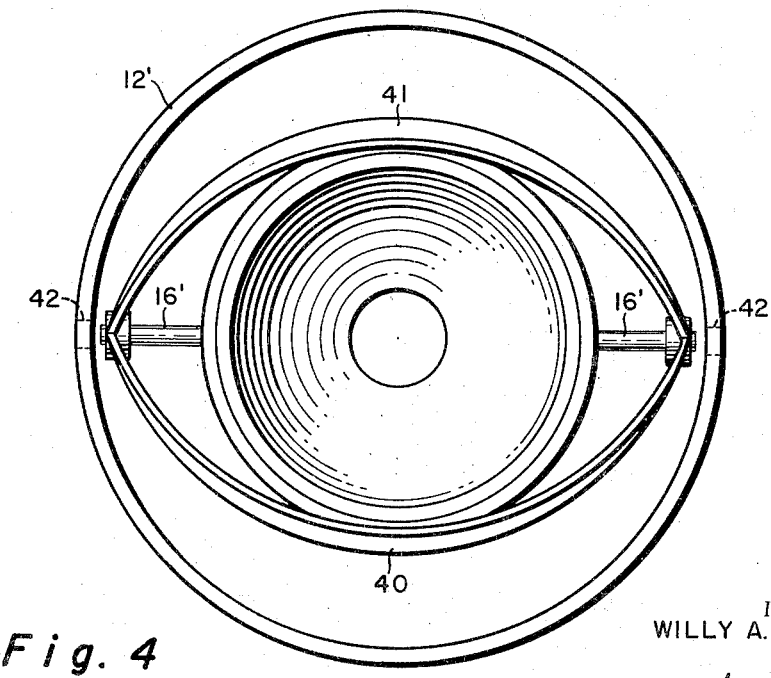
Fig. 4 is an end view of the device shown in Fig. 3.

Control members 40 and 41 have the configuration of a catenary whereby the members may be made extremely light and yet have sufficient strength to withstand the forces applied by the jet stream due to the fact that all loads produced by the jet stream on members 40 and 41 are in tension. Since members having the configuration of a catenary have maximum strength to resist forces applied in tension, such a construction is ideal when it is desired to eliminate bulk and weight. It should be noted that the device shown in Figs. 3 and 4 has been turned 90 degrees from the position shown in Fig. 1 such that the pivot pins 16' are viewed from the top thereof in Fig. 3 rather than from the side as in Fig. 1. An opening 42 is also formed radially through rear end portion 12' to permit installation of pivot pins 16'. It is evident that the control member as shown in Figs. 3 and 4 may also be mounted upon a gimbal arrangement such as shown in Fig. 2.

It is apparent from the foregoing that there is provided a new and novel jet direction control device which reduces drag to a minimum and provides a safety feature whereby the direction control means is automatically biased into neutral position due to forces generated by the gaseous jet. The device is simple and inexpensive in construction, yet is sturdy and reliable in operation.

Obviously many modifications and variations of the present invention are possible in the light of the above teachings. It is therefore to be understood that within the scope of the appended claims the invention may be practiced otherwise than as specifically described.

I claim:

1. A jet direction control device which comprises an elongated body means including a discharge end portion having a nozzle opening formed therein symmetrically about a longitudinal axis and adapted to exhaust a gaseous jet therefrom, a control means movably supported by said body means, said control means substantially surrounding said end portion and being symmetrical about said axis when in neutral position, said control means having a leading edge and a trailing edge, means for moving a portion of said trailing edge toward said axis, said body means having a rear end portion adjacent said discharge end portion and extending diametrically outward of said discharge end portion, said rear end portion having an annular cavity formed therein which opens toward the rear of said body means, the forward portion of said control means being disposed within said cavity when the control means is in neutral position, said cavity having an arcuate surface for reversing the gaseous flow induced between the outer surface of said discharge end portion and the inner surface of said control means during operation of the device.

2. A device as defined in claim 1 wherein the diametrically inner portion of said trailing edge is beveled whereby a gaseous jet issuing from said nozzle produces a force tending to bias said control means into neutral position.

3. A jet direction control device which comprises a body means including a discharge end portion having a nozzle opening formed therein and adapted to exhaust a gaseous jet therefrom, a control means pivotally supported by said body means and substantially surrounding said end portion, said control means having a leading edge and a trailing edge, said trailing edge being positioned closely adjacent the outer end of said discharge end portion and forming substantially no obstruction to a jet issuing from said nozzle when the control means is in neutral position, means for pivoting said control means out of neutral position, said body means having a rear end portion adjacent said discharge end portion and extending diametrically outward of said discharge end portion, said rear end portion having an annular cavity formed therein which opens toward the rear of said body means, the forward portion of said control means being disposed within said cavity when the control means is in neutral position, said cavity being at least partially arcuate in cross-sectional configuration for reversing the gaseous flow induced between the outer surface of said discharge end portion and the inner surface of said control means during operation of the device, the diametrically inner portion of said trailing edge being beveled, the beveled surface being substantially aligned with the rearward portion of the inner surface of said discharge end portion which defines said nozzle opening when said control means is in neutral position whereby a gaseous jet issuing from said nozzle produces a force tending to bias said control means into neutral position.

4. A device as defined in claim 3 wherein said control means is substantially annular in configuration, the inner surface of said control means defining a segment of a sphere.

5. A device as defined in claim 4 wherein said control means is pivotally supported on said body means by gimbal means whereby said control means may be actuated in a universal manner.

6. A device as defined in claim 3 wherein said control means comprises two elongated members having a longitudinal sectional configuration of a catenary, each of said elongated members encompassing substantially one-half of said discharge end portion, said elongated members being connected for simultaneous movement.

No references cited.